(12) United States Patent
Yang et al.

(10) Patent No.: US 11,459,234 B2
(45) Date of Patent: Oct. 4, 2022

(54) HYDROGEN STORAGE MATERIAL

(71) Applicant: ECOLE POLYTECHNIQUE FEDERALE DE LAUSANNE (EPFL), Lausanne (CH)

(72) Inventors: Heena Yang, Sion (CH); Andreas Züttel, Sion (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 184 days.

(21) Appl. No.: 16/961,788

(22) PCT Filed: Jan. 14, 2019

(86) PCT No.: PCT/EP2019/050758
§ 371 (c)(1),
(2) Date: Jul. 13, 2020

(87) PCT Pub. No.: WO2019/138099
PCT Pub. Date: Jul. 18, 2019

(65) Prior Publication Data
US 2021/0061653 A1 Mar. 4, 2021

(30) Foreign Application Priority Data
Jan. 12, 2018 (EP) .................... 18151472

(51) Int. Cl.
C01B 3/00 (2006.01)
B82Y 30/00 (2011.01)
B82Y 40/00 (2011.01)

(52) U.S. Cl.
CPC .......... *C01B 3/0078* (2013.01); *C01B 3/0021* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 6,290,753 | B1 * | 9/2001 | Maeland | B82Y 30/00 502/526 |
| 8,808,860 | B2 * | 8/2014 | Kim | H01J 1/304 428/408 |
| 2005/0118091 | A1 * | 6/2005 | Cooper | D01F 9/12 423/447.2 |
| 2011/0300063 | A1 | 12/2011 | Phillips, III | |
| 2012/0121891 | A1 * | 5/2012 | Kim | B82Y 10/00 977/734 |

(Continued)

OTHER PUBLICATIONS

Database WPI, Week 201802 Thomson Scientific, London, GB; AN 2017-81750E& Cn 107381 546 A (Univ Changzhou) Nov. 24, 2017.

(Continued)

*Primary Examiner* — Joseph D Anthony
(74) *Attorney, Agent, or Firm* — Thomas Coester Intellectual Property

(57) ABSTRACT

The present relates to a carbon material having a 3D structure and made of graphene oxide and carbon nanotubes, characterized in that the 3D structure consists in that the carbon nanotubes are located with some agglomeration between the graphene oxide layers so as to extend the spacing between the graphene oxide layers.

10 Claims, 5 Drawing Sheets

(56) References Cited

U.S. PATENT DOCUMENTS

| 2013/0295374 | A1* | 11/2013 | Tang | ................... | C01B 32/05 |
| | | | | | 252/502 |
| 2015/0125694 | A1* | 5/2015 | Kula | ................... | C30B 29/02 |
| | | | | | 428/371 |
| 2015/0318120 | A1* | 11/2015 | He | .................. | C23C 16/26 |
| | | | | | 427/249.4 |

OTHER PUBLICATIONS

Database WPI Week 201751 Thomson Scientific, London, GB; AN 2017-398093 & KR 101 744122 B1 (Kigam Korea Inst Geoscience & MINERAL) Jun. 7, 2017.

International Search Report dated Mar. 4, 2019.

* cited by examiner

HYDROGEN STORAGE MATERIAL

TECHNICAL FIELD

The present invention relates to a Hydrogen storage material and more particularly to a 3D carbon structure capable of enhanced hydrogen storage.

BACKGROUND OF THE ART

The hydrogen cycle consists of three sectors: hydrogen production from water, hydrogen storage and hydrogen combustion e.g. fuel cell. In general, the hydrogen storage can based on six different methods and materials: compressed gas, liquid hydrogen, physisorbed hydrogen, metal hydrides, complex hydrides and finally chemical hydrides. Despite the enormous progress made in the last 20 years in the development of hydrogen storage materials, the current limits are at approximately 20 mass % and 2000 kg·m$^{-3}$. This limits the stored energy to approximately half of the energy density of hydrocarbons.

Among the above mentioned methods, physisorbed hydrogen is particularly preferred because it is reversible and it theoretically allows to absorb a large quantity of hydrogen on the surface of low density materials, such as carbon material. The interaction energy of the Van der Waals interaction is in the order of 5 kJ·mol$^{-1}$ (for H$_2$) and therefore, significant amounts of adsorbed molecules are only found at low temperatures (100 K). According to a first approximation the hydrogen forms a monolayer of adsorbed molecules at the surface of the substrate, but a more accurate model for the adsorption of multiple incomplete layers, when raising the pressure, has been described by Brunauer, Emmett and Teller[i]. The amount of adsorbed hydrogen molecules (m$_{H2}$) is proportional to the specific surface area (A$_{ads}$/m$_{ads}$) of the adsorbing material according to the following formula:

$$m_{H2}/m_{ads} = A_{ads}/m_{ads} \cdot (M_{H2}/\rho_{H2})^{1/3} \cdot \rho_{H2}.$$

Carbon materials for physisorbed hydrogen storage is particularly preferred and are generally activated carbon, carbon nanotubes, and graphene or graphene oxide.

Activated carbon has been actively studied as an adsorbent because of its excellent adsorption ability. Especially, it is possible to mass-produce compared with other carbon materials, and it is relatively cheap (0.6-5.6 CHF/kg). The hydrogen storage capacity of activated carbon at 77 K is 2 to 5 mass % and around 1.2 mass % at room temperature and elevated pressure.

On the other hand, after the discovery of the carbon nanotubes with large specific surface areas and curved surfaces, the interaction of hydrogen with this new nanomaterials was intensively investigated. The linear dependency of the amount of adsorbed hydrogen on the specific surface area was confirmed on all kind of nanomaterials including Metal Organic Frameworks (MOF). However, despite all the attempts to increase the Van der Waals interaction energy, no material with a significantly increased isosteric enthalpy of adsorption was found. Further, nanoporous materials like MOF's exhibit an isotope effect that allows to separate H$_2$ from D$_2$ molecules. Isotope separation is technically interesting, for the preparation of isotope pure materials e.g. the separation of deuterium from hydrogen produced by electrolysis of water.

Finally, regarding graphene oxide, it is synthesized from graphite by a modified Hummer's method. The graphene is oxidized by acid solution treatment and exhibits functional groups such as epoxy, hydroxyl, and carboxyl groups. The hydrogen is stored between the layers of graphene oxide by the interaction with the functional groups. The hydrogen storage capacity of the film-type multi-layer graphene oxide can be increased with a simple heat treatment in order to control the amount of water molecules and oxygen groups between the layers. The hydrogen storage capacity is similar to that of activated carbon.

As a general conclusion, hydrogen adsorption in different carbonaceous materials with optimized structure was investigated at room temperature and 77 K. Activated carbon, amorphous carbon nanotubes, single-walled carbon nanotubes (SWCNTs) and porous carbon samples all follow the same adsorption model. At 77 K the adsorption isotherm of all samples can be explained with the Langmuir model, while at room temperature the storage capacity is a linear function of the pressure. The surface area and pore size of the carbon materials were characterized by N$_2$ adsorption at 77 K and correlated to their hydrogen storage capacity. A linear relation between hydrogen uptake and specific surface area (SSA) was obtained for all samples independent of the nature of the carbon material. The best material with a SSA of 2560 m$^2$/g shows a storage capacity of 4.5 wt % at 77K[ii].

Therefore, hydrogen storage in carbon material has the major disadvantage that the interaction energy is low (5 kJ·mol$^{-1}$ H$_2$) and, therefore, only at low temperature (77 K) significant amounts (>1 mass %) of hydrogen are adsorbed. As a consequence the equilibrium pressure is very low, far below atmospheric pressure. This makes the application of such a hydrogen storage material impossible.

There is therefore a need for a new type of hydrogen storage material.

Several investigations gave been carried out, for example, document U.S. Pat. No. 6,290,753 B1 refers to a Hydrogen storage in carbon material, and more particularly, to a method for storing hydrogen in a carbon material containing microstructures in the form of cones with cone angles being multiples of 60°. In this method, the carbon material is introduced in a reaction vessel which is evacuated while the carbon material is kept at a temperature of 295-800 K, after which pure hydrogen gas is introduced in the reaction vessel, the carbon material being exposed to a hydrogen gas pressure in the range of 300-7600 torr (0.4-10 bar) such that the hydrogen gas is absorbed in the carbon material. After this the reaction vessel is left at the ambient temperature with the carbon material under a fixed hydrogen gas pressure. For use, the hydrogen is released in the form of a gas from the carbon material either at ambient temperature or by heating the carbon material in the reaction vessel. In a method for refining a carbon material of this kind for hydrogen storage, the carbon material is produced in a reaction chamber with the use of a catalyst for adjusting the cone angle distribution of the microstructures. In order to achieve a positive result, this invention increased the hydrogen pressure from 300 to 7600 torr. It was confirmed that the hydrogen adsorption on activated carbon is possible up to 5 mass % at not further defined temperature. The hydrogen desorption was carried out at 150-200 K, and the amount of desorption was not described.

A second document US 20150125694 A1 refers to a nanocomposite material based on graphene for reversible storage of hydrogen. In this invention is disclosed a nanocomposite material for the reverse storage of hydrogen based on monolayer sheets of polycrystalline or monocrystalline graphene having a form of a cylindrical spiral roll of polycrystalline or monocrystalline graphene with a preferably constant spacing in the range from 0.2 to 2 nm. The spiral roll of polycrystalline graphene has grains with a minimum diameter of 50 nm. In this invention one showed hydrogen adsorption amount of graphene roll under hydrogen pressure with 5 Mpa from 6 to 7 mass %. The hydrogen adsorption temperature and desorption process were however not described.

A further document WO 2011084994 A1 refers to a carbon molecular sieve for hydrogen storage and adsorption of other light gases. This patent application shows a carbon molecular sieve composition for storing hydrogen and a method for forming a carbon molecular sieve material. In addition, a method of storing hydrogen using the carbon molecular sieve composition and a method for separating gases such as hydrogen or helium from mixtures of other gases is provided. This invention confirmed hydrogen adsorption from 1.5 to 3.5 mass % depends on pore size with increasing hydrogen pressure from 0.01 bar to 80 bar but the hydrogen adsorption temperature and desorption process were not described.

A last document US 20050118091 A1 shows a hydrogen storage utilizing carbon nanotube materials where the material for the storage of hydrogen comprises a single wall carbon nanotubes (SWCNT) wherein the majority of the diameters of the single wall carbon nanotubes of the assembly range from 0.4 to 1.0 nanometers (nm), and the average length is less than or equal to 1000 nm, or the diameters of the single wall carbon nanotubes of the assembly range from 0.4 to 1.0 nanometers (nm), and the heat ($-\Delta H$) of hydrogen adsorption of the material is within the range from 4 kcal·mol$^{-1}$ H$_2$ to 8 kcal/mole H$_2$ (16-32 kJ·mol$^{-1}$ H$_2$). This invention confirmed hydrogen adsorption/desorption amount of carbon nanotube with increasing hydrogen pressure from 0 atm to 75 atm psi. The amount of hydrogen adsorption is 7.5 mass %, and the desorption amount is 6 mass % at 293 K.

As explained, one of the main problems of the adsorption of hydrogen on the conventional carbon surface is the Van der Waals interaction which has the major disadvantage that the interaction energy is low (5 kJ·mol$^{-1}$ H$_2$) and, therefore, only at low temperature (77 K) significant amounts (>1 mass %) of hydrogen are adsorbed. As a consequence the equilibrium pressure is very low, far below atmospheric pressure. This makes the application of such a hydrogen storage material impossible.

In this regard, a primary object of the invention is to solve the above-mentioned problems and more particularly to provide a new Hydrogen Storage Material absorbing more than 5 mass % of hydrogen and desorbing the hydrogen at up to 350K.

Another object of the invention it to provide a new Hydrogen Storage Material where the interaction between hydrogen and the 3D carbon material is much stronger as compared to other carbon materials.

A further object of the invention it to provide a new Hydrogen Storage Material where the hydrogen capacity is very high compared to the specific surface area of the material. This makes the new 3D carbon material very interesting for hydrogen storage.

SUMMARY OF THE INVENTION

The above problems are solved by the present invention.

A first aspect of the invention is a 3D structure of carbon material from graphene oxide and carbon nanotubes. According to the present invention the expression 3D structure means that the graphene oxide and the carbon nanotubes are connected to each other in the material so as to provide better and more pathways and spaces for hydrogen adsorption than conventional materials because the carbon nanotubes which are added to the graphene oxide are agglomerated between the graphene oxide layers so that it extends the spacing between the graphene oxide layers.

Therefore, carbon nanotubes located at the spacing of graphene oxide layers can form a 3D structure and exhibit improved hydrogen adsorption properties as compared to the respective graphene oxides and carbon nanotubes alone.

A second aspect of the present invention relates to the synthesis of the 3D structure of carbon material from graphene oxide and carbon nanotubes.

A third aspect of the present invention relates to the application of the 3D structure carbon material as hydrogen storage materials.

The material of the present invention absorbs more than 5 mass % of hydrogen and desorbs the hydrogen at up to 350 K. Therefore, the interaction between hydrogen and the 3D carbon material is much stronger as compared to other carbon materials and the hydrogen capacity is very high compared to the specific surface area of the material. This makes the new 3D carbon material very interesting for hydrogen storage.

The carbon material of the present invention solves the technical problem of providing a hydrogen storage material with increased hydrogen bonding energy to the 3D carbon material as compared to the individual components. As a matter of fact, as shown below, the hydrogen desorption from the 3D carbon material was observed around 350K.

Also, as explained below, the hydrogen storage material provides a reversible hydrogen storage capacity greater than 5 mass % where the hydrogen was absorbed at p=50 bar and T=298 K.

Finally, the 3D carbon material exhibits a complete reversibility of the hydrogen sorption. This material shows 5.2 mass % hydrogen storage capacity after the adsorption and desorption process of hydrogen with 5 cycles and shows excellent rehydrogenation ability.

BRIEF DESCRIPTION OF THE DRAWINGS

Further particular advantages and features of the invention will become more apparent from the following non-limitative description of at least one embodiment of the invention which will refer to the accompanying drawings, wherein.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 1:
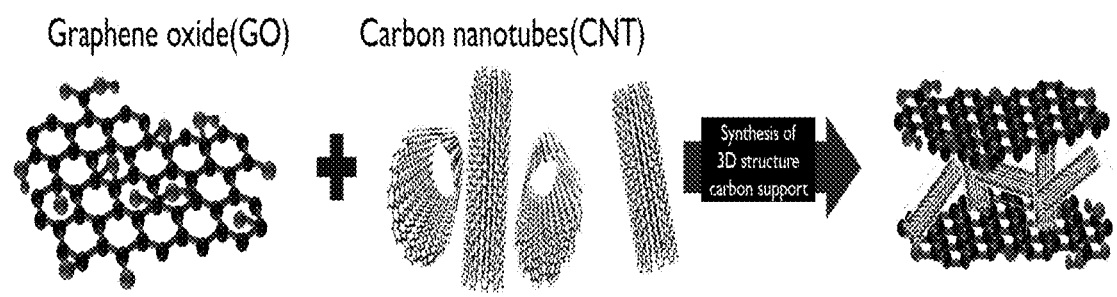
FIG. 1 represents a schematic diagram of the synthesis of the 3D structure carbon material of the present invention.

The present invention relates to a hydrogen storage material having 3D structure of carbon material, which is synthesized from graphene oxide and carbon nanotubes as schematically shown in FIG. 1. Preferably, the hydrogen storage capacity of the 3D carbon material of the present invention is 4.5 mass % or greater, more preferably 5 mass % or greater.

As shown in FIG. 1, the expression 3D structure means that the graphene oxide and the carbon nanotubes are connected to each other in the material of the present invention so as to provide better and more pathways and spaces for hydrogen adsorbing than conventional materials because the carbon nanotubes which are added to the graphene oxide are agglomerated between the graphene oxide layers so that it extends the spacing between the graphene oxide layers.

Therefore, carbon nanotubes located at the spacing of graphene oxide layers can form a 3D structure and exhibit improved hydrogen adsorption properties as compared to the respective graphene oxides and carbon nanotubes alone.

More particularly, according to a 3D structure carbon material manufacturing method of the present invention, graphene oxide and carbon nanotubes are dispersed in a deionized water and then sonicated. Then acid, such as HCl, preferably HCl 1M, is added and finally a reduction agent, such as Vitamin C is added and the mixture is stirred with low heating such as 323K. Finally, the solution is filtered and the product is washed.

EXAMPLES

Now an synthesis example of the 3D carbon material will be explained.

According to this example, one uses graphene oxide that is preferably synthesized by modified Hummer's method and carbon nanotubes, preferably MWCNT, 95.0% that purchased from Plasmachem in USA, for example.

According to the example, the 3D carbon material was obtained by linking the carbon nanotubes to the graphene oxide with Vitamin C. For the synthesis a 1:1 ratio of graphene oxide and carbon nanotubes (300 mg of each samples) were dispersed in 10 mL of deionized water for 3 h under mixing e.g. by sonication. To the fully dispersed carbon nanotubes and graphene oxide mixture 3-4 drops of acid e.g. 1M HCl were added for the surface treatment. Subsequently 300 mg of a reduction agent (such as vitamin C and HI) were dissolved. The mixture was stirred in an oil bath for 12 h at 323K.

Finally, the solution was filtered and the product was washed 5 times with 100 mL of deionized water and dried under vacuum at RT.

Figure 2:
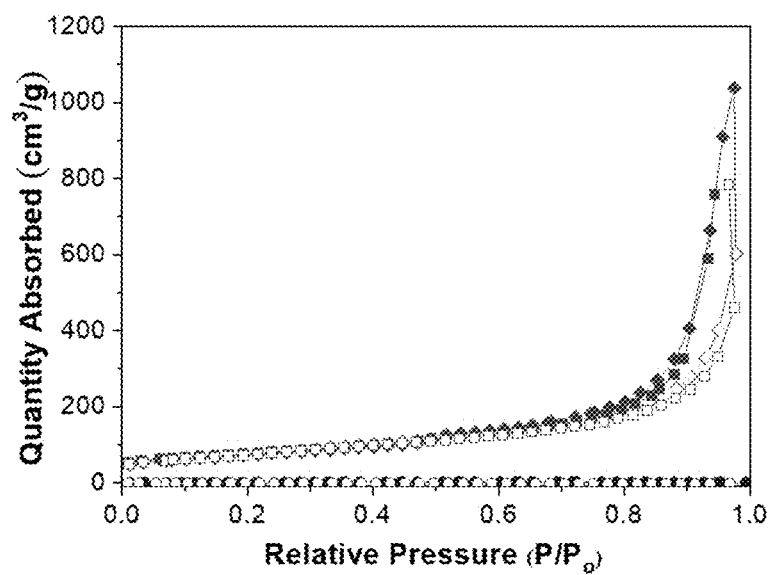
FIG. 2 represents BET adsorption isotherms (at 77K) measured with N$_2$ in liq. N$_2$ of various carbon materials.
Figure 3:
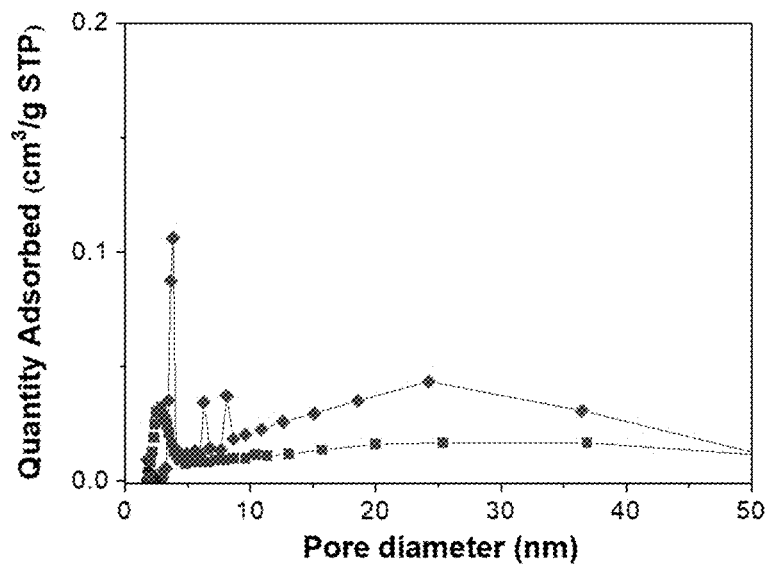
FIG. 3 schematically represents pore size distributions of various carbon materials.

FIGS. 2 to 9 show different characteristic of the synthetized product with comparative data of the used material alone. The synthesis product has a specific surface area of A/m=340 $m^2/g$ as shown in FIG. 2 which shows BET adsorption isotherms (at 77K) measured with $N_2$ in liq. $N_2$ of various carbon materials at a Conversion A=n($N_2$)·89833 $m^2/mol$=V($N_2$)·4 $m^2/cm^3$ STC, and contains a large amount of pores with a diameter of 4 nm as shown in FIG. 3 showing the pore size distributions of various carbon materials calculated from the BET adsorption isotherms by Barrett-Joyner-Halenda (BJH) Analysis.

Figure 4:
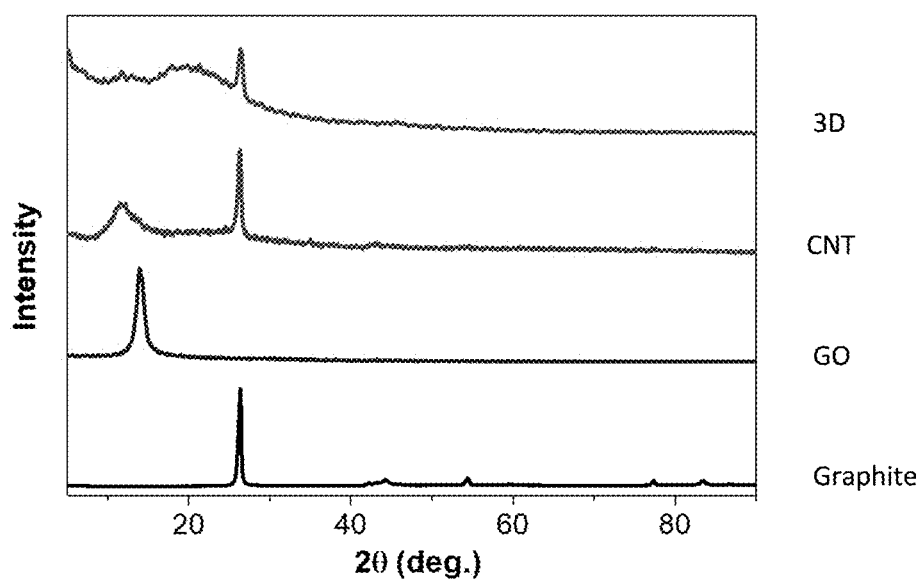
FIG. 4 schematically represents XRD patterns of various carbon materials.

FIG. 4 shows XRD patterns of graphite, Graphene oxide (GO), Carbon nanotubes (CNT) and 3D structure carbon material (3D) that exhibit distinct peaks. The main peak of the stacked layers of graphite is observed at 26° in 2θ by C (002). Upon chemical oxidation of graphite using Hummer's method, the C (002) peak was shifted to 11° in 2θ due to the expansion of stacked graphite layers by the incorporation of oxygenated functional groups such as epoxy, carboxyl and hydroxyl groups, resulting in GO.

Figure 5:
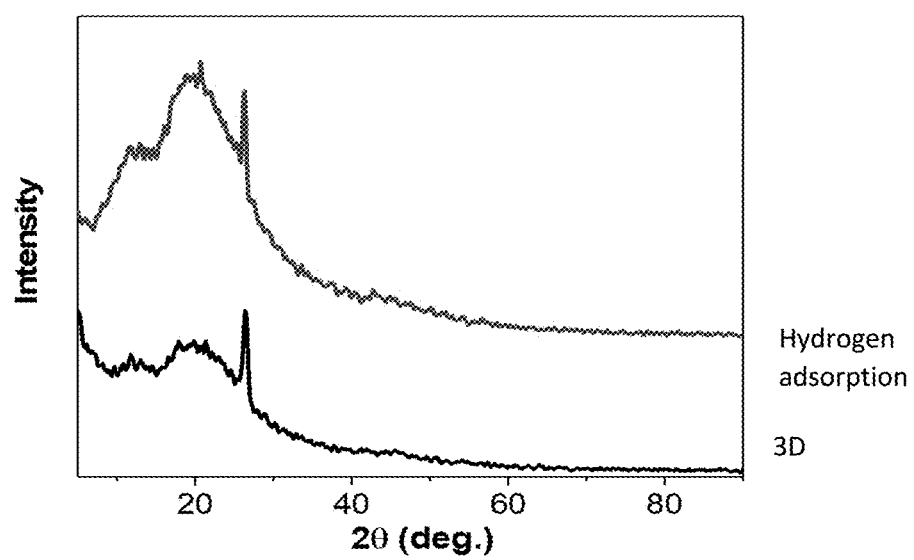
FIG. 5 schematically represents XRD patterns of the 3D structure carbon material.

The broad peak at 20° in 2θ shown in FIG. 5 is characteristic for the 3D structure carbon material. This peak is significantly increasing upon hydrogen absorption as represented in the pattern above, indicating that the structural feature that leads to the additional peak, i.e. the fingerprint of the 3D structure carbon material, is also the place where the hydrogen interaction occurs.

Figure 6:
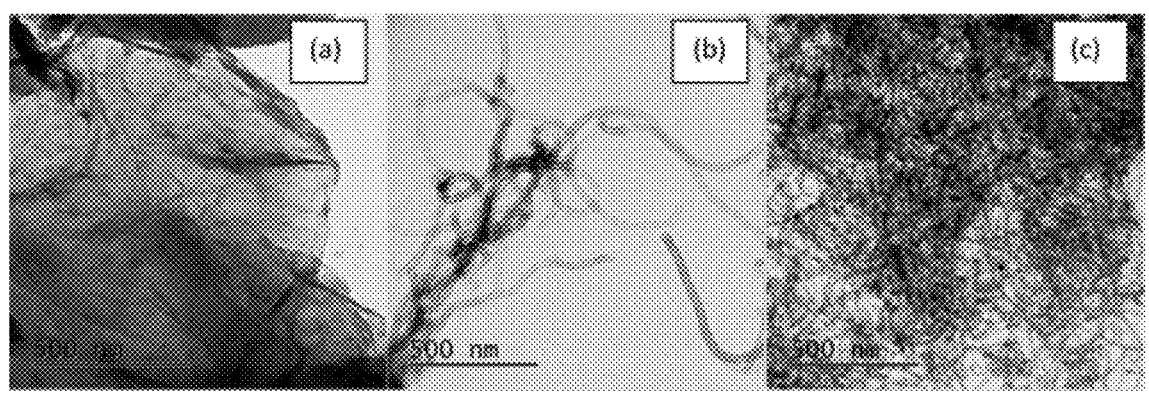
FIG. 6 schematically represents TEM images of various carbon materials.

FIG. 6 shows the TEM image of the Graphite oxide (a), the MWCNT (b) and the structure of 3D carbon material (c). We clearly see that the CNT are aggregated on the graphene layer to form a complex, dense structure as compared to the free MWCNT structure.

Figure 7:
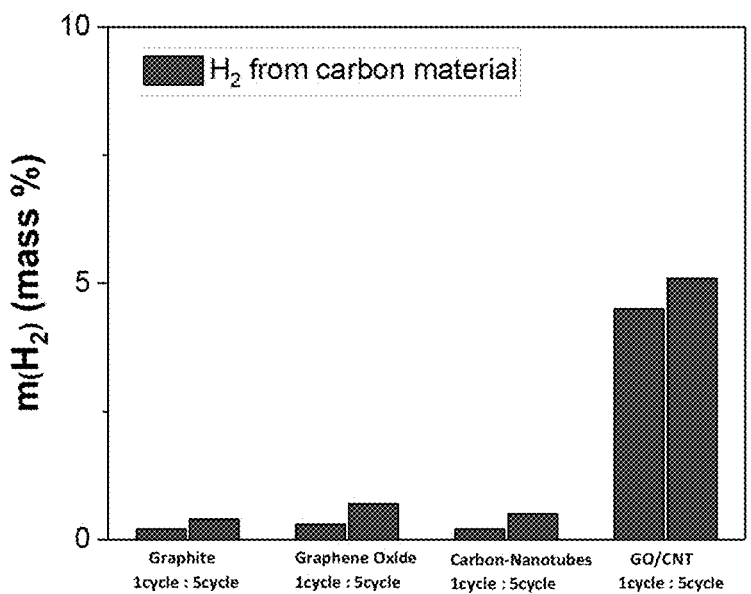
FIG. 7 schematically represent the hydrogen storage capacity of various carbon materials.
Figure 8:
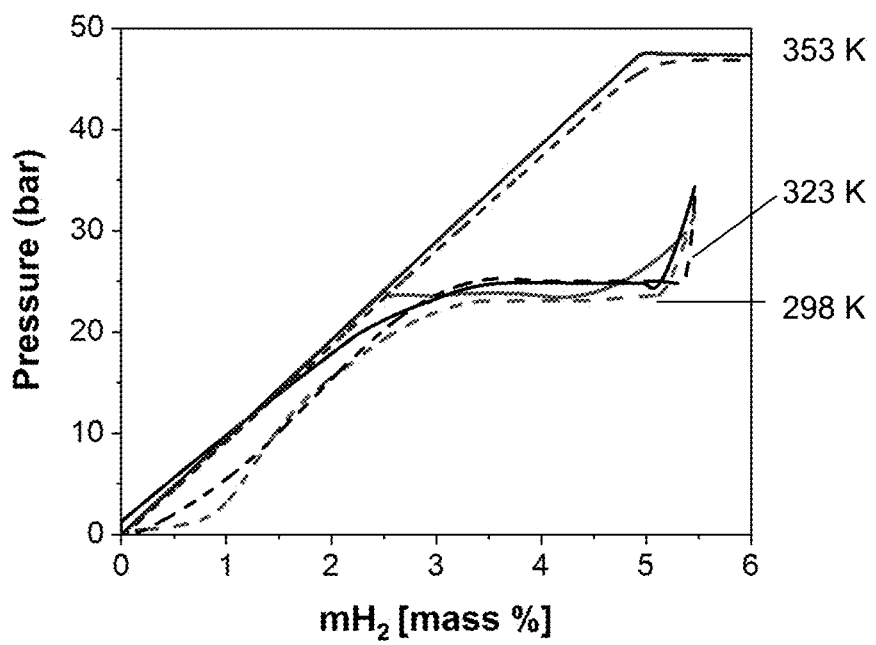
FIG. 8 schematically represents the hydrogen absorption on 3D structure carbon material at different temperatures.

FIG. 7 shows the hydrogen storage capacity measured as the hydrogen desorption capacity of the graphite, the graphene oxide, the carbon nanotubes and the 3D carbon material which was measured of the as prepared sample and in the $5^{th}$ thermal desorption cycle (303K-573K). In between of these two cycles, hydrogen was absorbed by a constant flow of 5 $Ncm^3$/min on samples of 50 mg at 303 K until the absorption reached saturation and the pressure increased until 50 bar as shown in FIG. 8 which schematically represents the Hydrogen absorption on 3D structure carbon material at 298 K, 323 K and 353 K (solid line for adsorption, dotted line for desorption).

Figure 9:
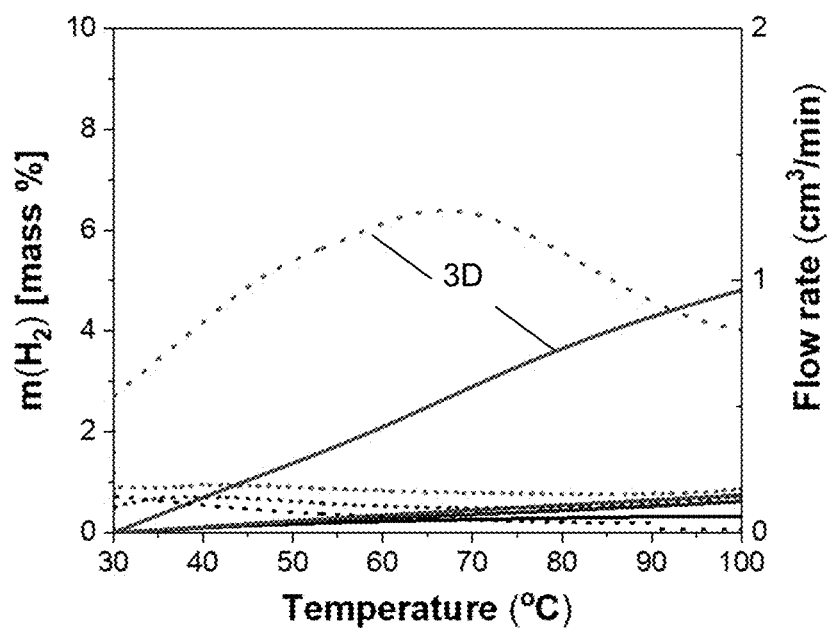
FIG. 9 schematically represents the thermal hydrogen desorption from various carbon materials.

Subsequently the sample was evacuated and then thermally desorbed and the amount of desorbed hydrogen was measured by a mass flow controller. Only the 3D graphite material shows a significant hydrogen desorption as represented in FIG. 9 with a maximum flow around 350 K. This indicates that the binding energy for hydrogen in the new 3D graphite material is much higher as compared to the physisorption energy. The hydrogen sorption is therefore reversible and the capacity slightly increased within the first 5 absorption desorption cycles.

The 3D structure of the 3D carbon material of the present invention can have several applications. More particularly, it can be used as a hydrogen storage material, a support for various catalysts and/or as an adsorbent for all kind of gases. More particularly, the application of the material of the present invention can be used in any reaction in which hydrogen adsorption and desorption are proceeded with a hydrogen storage material.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This is particularly the case for the source of the first material, i.e. the graphene oxide and the CNT, or the type of acid or the type of reduction agent.

The invention claimed is:

1. Hydrogen storage material comprising: a carbon material having a 3D structure and formed of graphene oxide and carbon nanotubes, characterized in that the 3D structure consists in that the carbon nanotubes are agglomerated between the graphene oxide layers so as to extend the spacing between the graphene oxide layers.

2. Hydrogen storage material comprising: a carbon material according to claim 1, characterized in that the carbon nanotubes are multi-walled carbon nanotubes.

3. Hydrogen storage material according to claim 1, characterized in that it has a hydrogen storage capacity of 4.5 mass % or greater.

4. Hydrogen storage material according to claim 1, characterized in that it has a hydrogen storage capacity of 5 mass % or greater.

5. Hydrogen storage material according to claim 4, characterized in that the hydrogen was absorbed at p=50 bar and T=298 K.

6. A Carbon material synthesis method for manufacturing a carbon material having a 3D structure and made of graphene oxide and carbon nanotubes, characterized in that the 3D structure consists in that the carbon nanotubes are agglomerated between the graphene oxide layers so as to extend the spacing between the graphene oxide layers, comprising the steps of dispersing graphene oxide and carbon nanotubes in deionized water, mixing, adding an acid and a reduction agent, stirring, and recovering the carbon material.

7. The Carbon material synthesis method according to claim 6, characterized in that the recovering step involves filtering and washing.

8. The Carbon material synthesis method according to claim 6, characterized in that the acid is HCl 1M.

9. The Carbon material synthesis method according to claim 6, characterized in that the reduction agent is Vitamin C.

10. The Carbon material synthesis method according to claim 7, characterized in that the graphene oxide and the carbon nanotubes are dispersed in a ratio 1:1.

* * * * *